(12) United States Patent
Mathew et al.

(10) Patent No.: US 9,811,917 B2
(45) Date of Patent: Nov. 7, 2017

(54) CONFIDENCE ESTIMATION FOR OPTICAL FLOW UNDER LOW LIGHT CONDITIONS

(71) Applicant: Texas Instruments Incorporated, Dallas, TX (US)

(72) Inventors: Manu Mathew, Bangalore (IN); Hrushikesh Tukaram Garud, Parbhani (IN); Soyeb Noormohammed Nagori, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 3 days.

(21) Appl. No.: 15/169,153

(22) Filed: May 31, 2016

(65) Prior Publication Data

US 2017/0206665 A1    Jul. 20, 2017

(30) Foreign Application Priority Data

Jan. 14, 2016    (IN) .............................. 201641001331

(51) Int. Cl.
*G06K 9/00* (2006.01)
*G06T 7/20* (2017.01)
*G06K 9/48* (2006.01)
*G06K 9/62* (2006.01)
*G06T 5/00* (2006.01)

(52) U.S. Cl.
CPC ............ *G06T 7/2066* (2013.01); *G06K 9/481* (2013.01); *G06K 9/6282* (2013.01); *G06T 5/002* (2013.01); *G06T 7/2033* (2013.01)

(58) Field of Classification Search
CPC ..... G06T 7/2066; G06T 7/2033; G06T 5/002; G06K 9/481; G06K 9/6282
USPC ........................................................ 382/107
See application file for complete search history.

(56) References Cited

U.S. PATENT DOCUMENTS

2011/0013837 A1*    1/2011    Bergman ............... G06T 7/187
382/173

* cited by examiner

*Primary Examiner* — Gregory F Cunningham
(74) *Attorney, Agent, or Firm* — Robert D. Marshall, Jr.; Charles A. Brill; Frank D. Cimino

(57) ABSTRACT

A confidence map for optical flow gradients is constructed calculating a set of census texture gradients for each pixel of an image, filtering said gradients and extracting confidence values from said gradients using a plurality of decision tree classifiers. A confidence map is then generated from said confidence values.

8 Claims, 3 Drawing Sheets

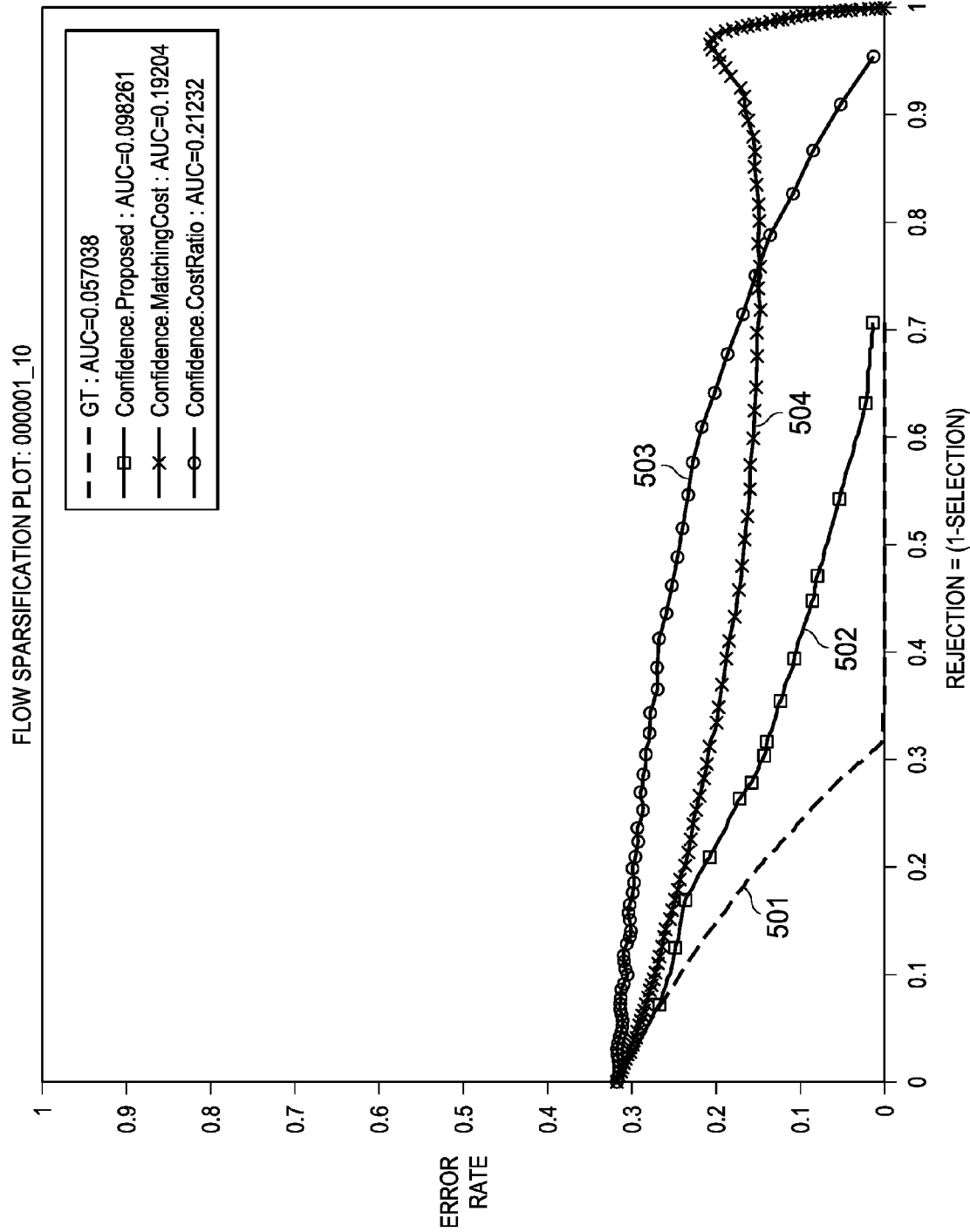

CONFIDENCE ESTIMATION FOR OPTICAL FLOW UNDER LOW LIGHT CONDITIONS

CLAIM OF PRIORITY

This application claims priority under 35 U.S.0 119(e)(1) to Indian Provisional Application No. 201641001331 filed Jan. 14, 2016

TECHNICAL FIELD OF THE INVENTION

The technical field of this invention is optical flow estimation.

BACKGROUND OF THE INVENTION

Optical flow or optic flow is the pattern of apparent motion of objects, surfaces, and edges in a visual scene caused by the relative motion between an observer (an eye or a camera) and the scene. The concept of optical flow was introduced by the American psychologist James J. Gibson in the 1940s to describe the visual stimulus provided to animals moving through the world. Subsequently the term optical flow has been co-opted in the computer vision domain to describe pixel motion in between two temporally ordered images of the scene, and incorporate related techniques of estimation of pixel motion. The optical flow estimation techniques are further integrated in related techniques of image processing and navigation control.

Methods of navigation control are of special interest in advanced driver assistance systems (ADAS). Motion detection in ADAS is fundamental to solving various problems such as object segmentation, time-to-contact information, depth estimation, structure from motion and focus of expansion calculations etc. One of the most widely used techniques for motion detection is the optical flow estimation. Thus, when used in ADAS, accuracy and speed of the optical flow estimation is a critical component in guaranteeing overall reliability of the ADAS. Accordingly, there is a need for a real-time optical flow estimation system having sufficient accuracy in all possible scenarios.

Optical flow estimation is a challenging problem. There are many scenarios where the flow estimation can go wrong such as occlusions, a new object coming into the camera's field of view, or an object going out of the camera's field of view. Camera rotations can make it difficult (or sometimes impossible) to estimate the correct optical flow. Low visibility (night vision, rain or fog), noise in the image, high rates of motion etc., are some other difficult scenarios for optical flow estimation. Flow estimation can also be challenging around moving object boundaries.

The estimated optical flow algorithm is typically used by a higher level algorithm such as the object tracking algorithm. It is important for the higher level algorithm to know where the optical flow estimation is correct and where it is likely to be wrong—so that the higher level algorithm can either discard the potentially incorrect flow estimates or assign proper weight based on the estimated correctness of the optical flows. Accordingly there is a need for computing a confidence map associated with the optical flow. This confidence map then indicates the confidence in the optical flow estimation—whether the flow estimation is likely to be correct or not.

SUMMARY OF THE INVENTION

A method for estimating a score or measure for optical flow is shown that generates a confidence map indicating confidence limits or weights on a pixel by pixel basis. This allows higher level algorithms to assign lesser importance, or to ignore altogether areas of a frame that have defective optical flow values.

The census texture gradient is a powerful feature to handle low light or low texture regions. In low light or low texture regions, the flow vector may be incorrect. The census texture gradient and the smoothened version of it is capable to detect such regions.

BRIEF DESCRIPTION OF THE DRAWINGS

These and other aspects of this invention are illustrated in the drawings, in which:

FIG. 4 shows a processor that the invention may be implemented on; and

FIG. 5 shows a comparison of this invention and prior art methods.

DETAILED DESCRIPTION OF PREFERRED EMBODIMENTS

This invention shows a dense optical flow estimation algorithm using a quasi-parametric approach, capable of accurate, highly precise and efficient optical flow estimation over a large range of relative pixel motions.

While there has been optical flow algorithms developed in the prior art, there has not been an attempt to generate a confidence map in real time, along with the optical flow. The estimated confidence map helps to understand which of the flow values are correct and which of them are potentially wrong.

Figure 1:
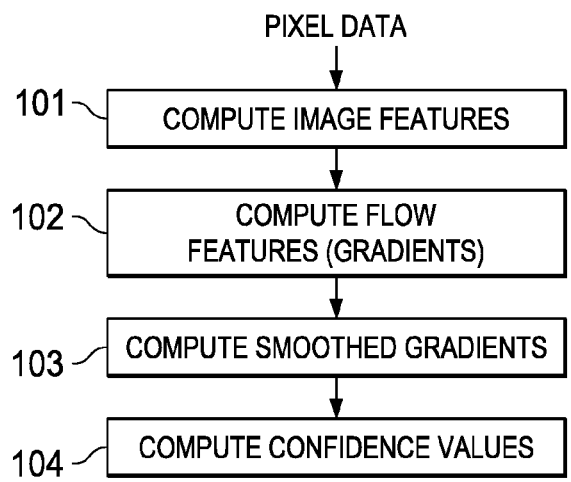
FIG. 1 shows a high level block diagram of the invention.

The described optical flow confidence map generation algorithm shown on FIG. 1 is implemented as follows:

For every pixel, a set of features are computed. The features include image features 101 and flow features 102. Smoothened versions 103 of the features are also computed.

These features are sent to a decision tree classifier 104 that outputs a classifier score. This classifier score is then converted to a confidence value.

The features used are gradients of flow, matching cost measures and gradients of the image for computation of the confidence measure. These are defined as:

Gradient of the U component of the optical flow (Gu)
Gradient of the V component of the optical flow (Gv)
Cost (or distance) corresponding to the best match (C0)
Delta matching cost=Second_best_cost-best_cost Cd=(C1-C0)
Gradient magnitude of the input image (Gm)
1. Cg=Census Texture Gradient
   Su=Smoothened version of Gu
   Sv=Smoothened version of Gv
   S0=Smoothened version of C
   Sd=Smoothened version of Cd
   Sm=Smoothened version of Gm
2. Sg=Smoothened version of Cg Using the above features, a feature vector is constructed for every pixel. However some implementations may use only a subset of these features in the feature vector. Other implementations may use all 12 features:

Gu, Gv, C0, Cd, Gm, Cg, Su, Sv, S0, Sd, Sm, Sg

This feature vector is then processed by a decision tree classifier to derive the confidence measure.

Gradients are computed as follows. Let X be the input to the gradient function, and for any location (i,j), a simplified form of the backward gradient is defined as:
g=[abs(X(i,j)−X(i-1,j))+abs(X(i,j)−X(i,j-1))]    G(i,j)=min((g<<GRADIENT_SHIFT),GRADIENT_MAX)

Typical range of GRADIENT SHIFT is between 0 to 8 and that of GRADIENT MAX 255 to 65535. The value of GRADIENT MAX also depends on range of X itself.

The above gradient method is used to compute the gradients of the flow values (Gu, Gv), and the gradient of the image (Gm).

Census Texture Gradient Computation (Cg)

Census texture gradient is not sensitive to intensity variations.

Let C(i,j) denote the census transform at row i, column j
This is a binary string of certain length (depending on the exact nature of the census transform used)

Let H(c1, c2) denote the hamming distance between census signatures c1 and c2

Census gradient to be used is:
Cg(i,j)=H(C(i,j), C(i-1,j))+H(C(i,j), C(i,j-1))

The Hamming distance between two strings of equal length is the number of positions at which the corresponding symbols are different. It indicates the minimum number of substitutions required to change one string into the other, or the minimum number of errors that could have transformed one string into the other.

Figure 2:
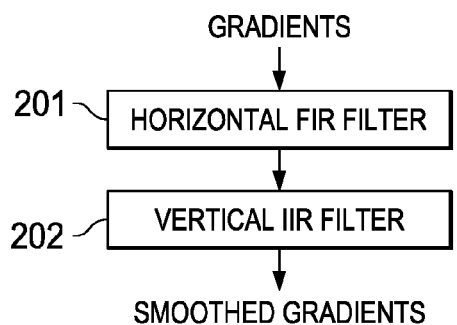
FIG. 2 shows a block diagram of the smoothening operation.

A smoothening operation is performed by a 2 dimensional separable combination of FIR and IIR filters as shown on FIG. 2. FIR filtering 201 is implemented in the horizontal direction followed by IIR filtering 202 in the vertical direction. FIR filters are more controllable and are seen to be best for this application from a quality point of view. However, using an FIR filter in vertical direction adds to the delay and increases the line size of the buffers required—therefore an IIR filter is used in the vertical direction.

For any location (i,j), a simplified form of the smoothening operation may be implemented as follows:
X is the input to the smoothening function, SmoothH (i,j)=sum(X(i,j-8+m)); m=0,1, . . . 17 where SmoothH(i,j) is the horizontally filtered version (intermediate value).

This is followed by IIR filtering vertically with the previous line of output as follows:
S(i,j)=(SmoothH(i,j)*SMOOTH_ALPHA+S(i-1,j)*SMOOTH_BETA) where S(i,j) is the output of the smoothening operation and S(i-1,j) is the corresponding output from the previous line.

The above smoothening method is used to compute Su, Sv, S0, Sd, Sm and Sq.

Figure 3:
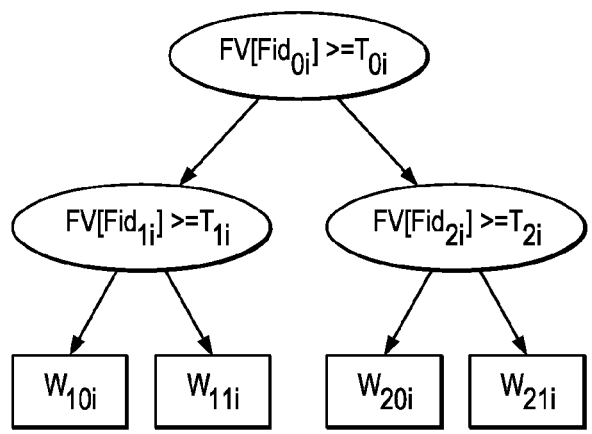
FIG. 3 shows the decision tree.

The 2 level decision tree shown in FIG. 3 then selects a weight based on input features and thresholds. Several decision trees are used in the implementation shown and weights are accumulated from each of them.

In FIG. 3, subscript 'i' indicates the ith decision tree.

FV indicates the Feature Vector array of size M.

Fidx represents an index into the Feature Vector, taking values from 0 to (M-1).

The entries Thx are threshold values for comparisons.

Wxx are weight values used to generate scores.

In the example configuration shown, a set 16 decision trees are used to convert the feature vectors into a score value. The values of the decision trees can be represented in Table 1:

TABLE 1

| | | Tree Number | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Node 0 | $Fid_0$ $Th_0$ | | | | | | | | | | | | | | | | | |
| Node 1 | $Fid_1$ $Th_1$ $W_{10}$ $W_{11}$ | | | | | | | | | | | | | | | | | |
| Node 2 | $Fid_2$ $Th_2$ $W_{20}$ $W_{21}$ | | | | | | | | | | | | | | | | | |

For each column, the partial score Vi is computed that corresponds to one column of the above table:
Vi=((FV[Fid0[i]]<Th0[i])&&(FV[Fid1[i]]<Th1[i]))*W10[i]+((FV[Fid0[i]]<Th0[i])&&(FV[Fid1[i]]>=Th1[i]))*W11[i]+((FV[Fid0[i]]>=Th0[i])&&(FV[Fid2[i]]<Th2[i]))*W20[i]+((FV[Fid0[1]]>=Th0[i])&&(FV[Fid2[1]]>=Th2[i]))* W21[i];

The accumulated score V=(V1+V1+ . . . +V15) is the sum of the scores of 16 decision trees. This accumulated score V can exceed 16 bits.

The entries in the table are usually produced by a heuristic training algorithm with manually selected values.

The confidence map is calculated from the accumulated score V by scaling the accumulated score and clipping it to a suitable range—for example between 0 and 15. This can be done as follows:
CS=(V*OUTPUT_MULT_FACTOR_LINEAR)>>OUTPUT_SHIFT_FACTOR C=min(max(CS, −8), +7)+8

The confidence map, C, is thus quantized to discrete levels, for example 0,1, . . . , 15 (4 bits) so it can be represented in fixed bit precision.

Figure 4:
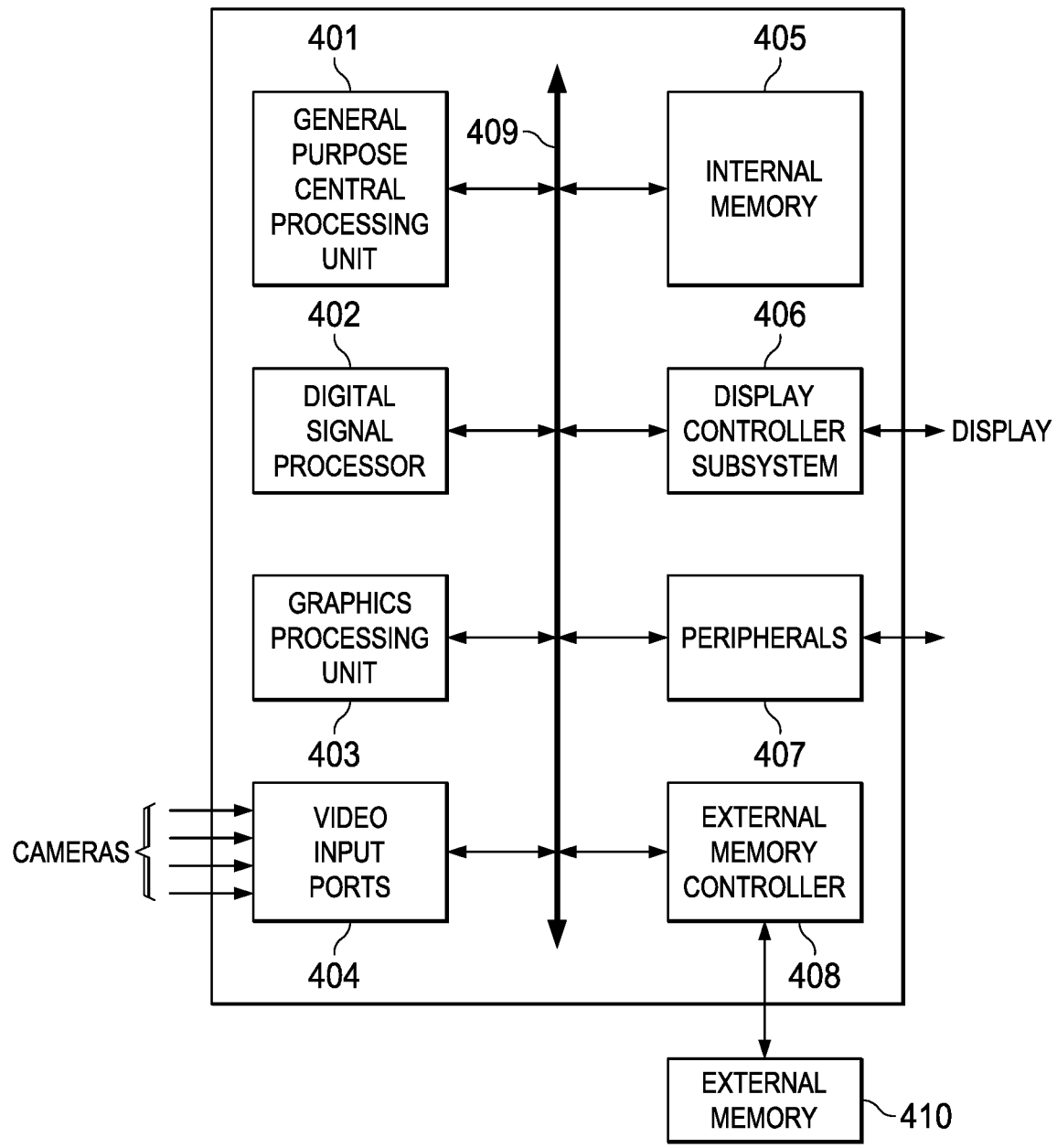

FIG. 4 shows a processor that may be used to implement the methods of this invention. The processor consists of a general purpose processing unit 401, a digital signal processor 402, a graphics processing unit 403, one or more video output ports 404, internal memory 405, a display controller subsystem 406, one or more peripherals 407, an external memory controller 408, and external memory 410. These system blocks are operable to communicate through bus 409.

FIGS. 5 shows the performance of the method described in this invention, compared to methods used in the prior art. In this figure, matching cost 504 and the cost ratio 503 is compared to the performance 502 of this invention and to GT, the ground truth 501—this is the actual correctness of the optical flow. The methods are evaluated by looking at the AUC—the area under the curve. The better the match, the lower the AUC, as shown on FIG. 5.

Left-right consistency check is typically used in the prior art for confidence map estimation for stereo disparity computation. Similarly, for optical flow confidence estimation, one could use a forward-backward check - however the optical flow confidence map estimation shown in this invention is are able to generate accurate confidence estimates without need for explicit forward/backward check. This helps in reducing computation complexity significantly as performing the check would have roughly doubled computational complexity.

Variance or central gradient of flow has been seen to be used as features for optical flow confidence estimation in the prior art—this requires several neighboring pixels/lines and hence requires several line buffers for storage, with a delay in the output. However, in the approach shown a simple backward gradient is used with no additional delay - and only one previous line is required for the gradient computation.

Confidence estimation in the prior art uses either features obtained while running the optical flow for a smaller resolution, or features scaled by FIR filtering/resizing. Both these approaches are complex to implement in hardware. The first approach needs data from the smaller resolution to be transported via external memory to the stage were the higher resolution optical flow is computed. The second approach needs several lines of features for the filtering operation.

What is claimed is:

1. A method of confidence estimation for optical flow comprising the steps of:
    computing the census texture gradient (Cg) features for each pixel of an input image;
    computing smoothened versions of said features (Sg);
    constructing a feature vector for each pixel of the input image;
    computing a classifier score from said features by employing a decision tree classifier;
    converting the classifier score into a confidence score.
2. The method of claim 1, wherein:
    the steps of computing said census texture gradient is implemented as follows:
    $Cg(i,j)=H(C(i,j), C(i-1,j))+H(C(i,j), C(i,j-1))$
    Where $C(I,j)$ is the census transform at row i and column j, and $H(c1,c2)$ is the hamming distance between census points c1 and c2.
3. The method of claim 1, wherein:
    the steps of computing said smoothened versions of said gradients consists of:
    applying an FIR filter to the gradients in the horizontal dimension;
    applying an IIR filter to the gradients in the vertical dimension.
4. The method of claim 3, wherein:
    Said FIR filter is implemented as follows:
    $SmoothH(I,j)=sum(X(i,j-8+m)); m=0,1, \ldots 17$
    where X is the input gradient to the smoothening function and $Smooth(i,j)$ is the horizontally filtered gradient.
5. The method of claim 3, wherein:
    said IIR filter is implemented as follows:
    $S(i,j)=(SmoothH(i,j)*SMOOTH\_ALPHA+S(i-1,j)*SMOOTH\_BETA)$
    where $S(I,j)$ is the output of the smoothening operation, $SmoothH(i,j)$ is the output of the FIR filter operation, and $S(i-1,j)$ is the corresponding output from the previous line.
6. The method of claim 1, wherein:
    said feature vector is constructed using Cg and Sg, and is processed by said decision tree classifier to extract confidence values.
7. The method of claim 1, wherein:
    said confidence map is constructed from the scores from said decision tree classifier.
8. An apparatus for confidence estimation for optical flow comprising of:
    a processor operable to
        compute a set of census texture gradient features for each pixel of an input image;
        compute a smoothened version of said features;
        construct a feature vector from said features;
        construct a confidence map from said feature vector.

* * * * *